Figure 2:
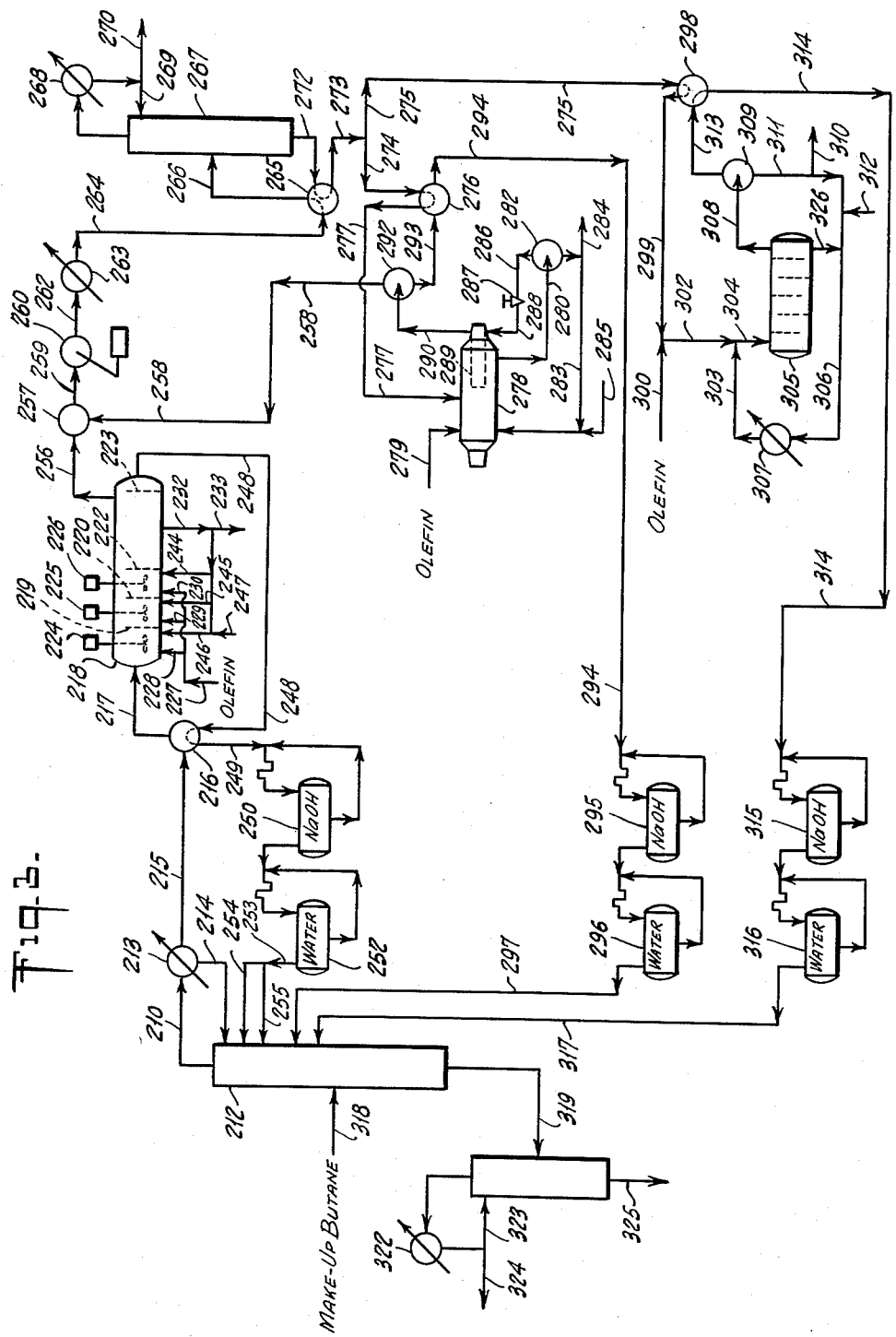

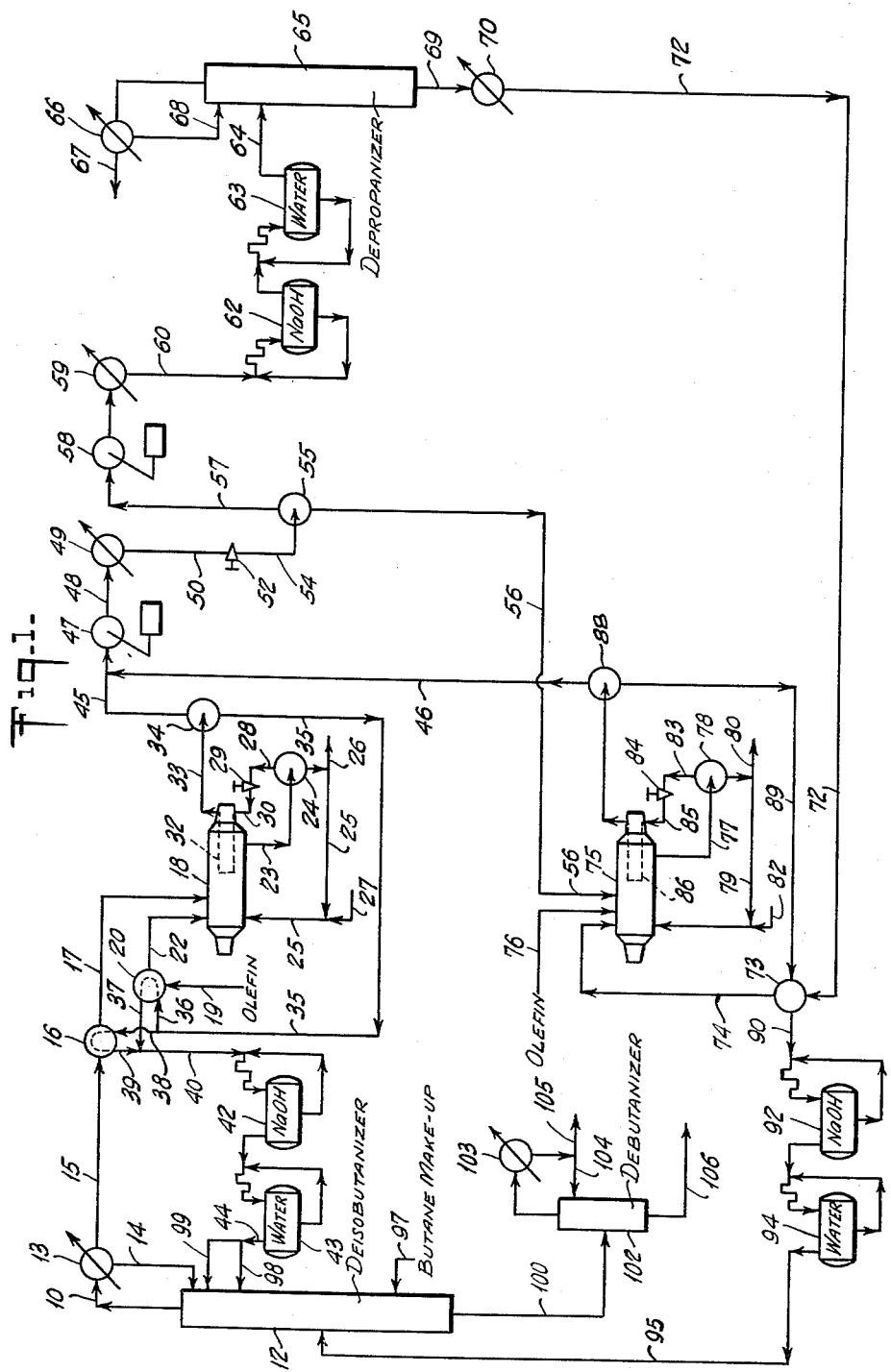

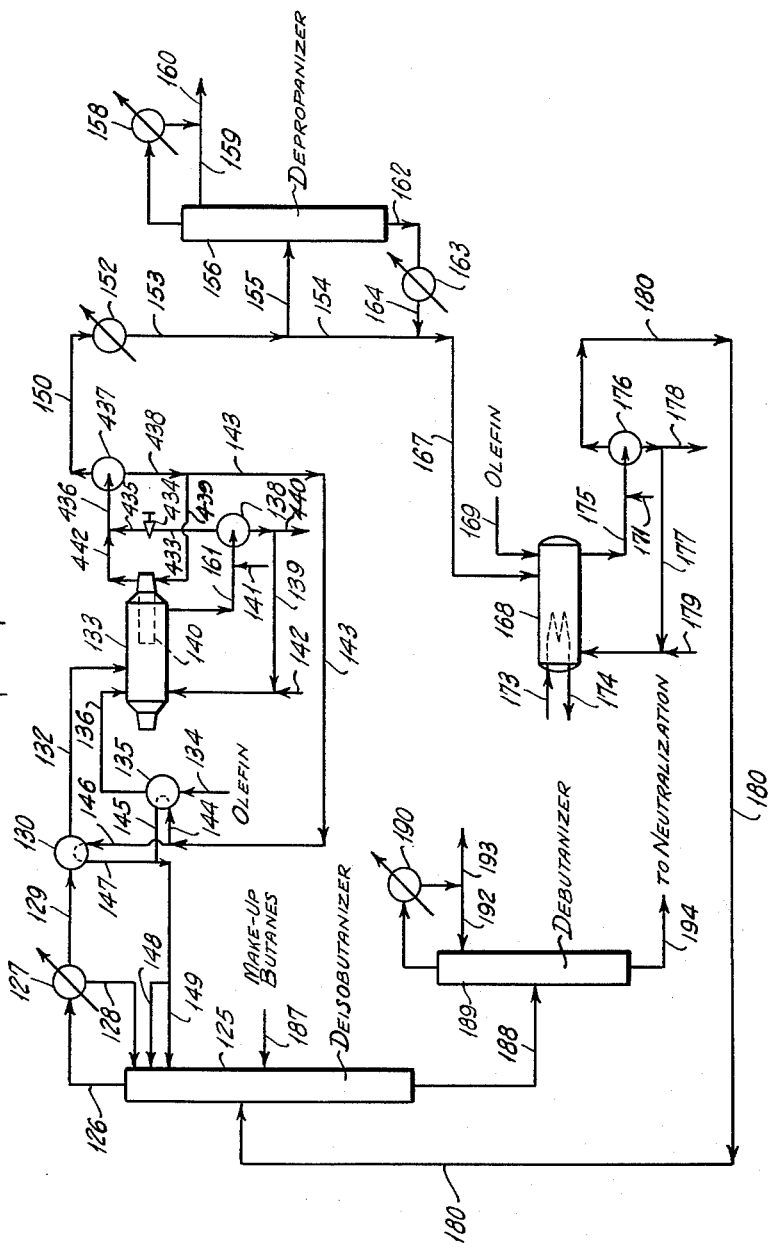

Nov. 7, 1961 F. A. CLAUSON 3,007,982
ALKYLATION PROCESS
Filed Aug. 5, 1958 3 Sheets-Sheet 3

United States Patent Office 3,007,982
Patented Nov. 7, 1961

3,007,982
ALKYLATION PROCESS
Frank A. Clauson, Roslyn Heights, N.Y., assignor to Texaco Inc., a corporation of Delaware
Filed Aug. 5, 1958, Ser. No. 753,303
3 Claims. (Cl. 260—683.46)

This invention relates to an improved process for catalytic alkylation, and more specifically to such process wherein an olefin-based alkylatable material is alkylated with isobutane.

In an alkylation of this type a preponderance of isobutane (generally as much as 70 to 80 volume percent, or even more, of all the hydrocarbons in the reaction mixture) over alkylatable material and hydrocarbon diluents is used to direct the reaction towards production of the most valuable aviation or automotive fuels. Consequently, a great deal of isobutane must be recovered and recycled for reuse if the process is to be practical.

The alkylatable material for reacting with isobutane is olefin-based, i.e. it is generally an olefinic hydrocarbon itself such as propylene, butylene or the like, but it also can be an alkyl sulfate or fluoride (as obtained for example in a so-called "two stage" process wherein an olefinic hydrocarbon is absorbed in sulfuric acid or HF as a first stage in the alkylation operation), or an alkyl halide, suitably an alkyl fluoride or chloride which can be made readily from olefinic hydrocarbons by other means.

The contacting of the excess isobutane with the alkylatable material and catalyst is done in liquid phase with a catalyst such as hydrogen fluoride, alkylation temperatures as high as about 100° F. can be tolerated, but the most desirable alkylation temperatures are generally lower than this. With a catalyst such as sulfuric acid alkylation temperatures substantially above about 75° F. are usually not used. The most desirable low temperature, e.g. ordinarily below about 75° F. and advantageously 30° to 55° F., can be maintained in the alkylation zone either by autorefrigeration of that zone or by effluent refrigeration applied to that zone.

In an effluent refrigeration system the output of the alkylation zone is separated into a hydrocarbon phase and a liquid catalyst phase, the separated hydrocarbon phase is passed into a flash zone of lower pressure where any low boilers, including some of the isobutane present, are vaporized with concomitant cooling of the remaining liquid hydrocarbons including alkylate, and at least a part of the remaining liquid hydrocarbons are used to refrigerate the reaction zone indirectly. In such operation the alkylation zone and effluent separator are maintained under sufficient pressure to keep all components in the liquid phase. Flashing in a flash zone as referred to herein denotes the practically adiabatic forming of chilled vapors and residual liquid by reduction of pressure on a liquid hydrocarbon material. In an autorefrigeration system the lower boiling hydrocarbons, including some of the isobutane present, are evaporated directly from the contents of the alkylation reaction zone to cool it.

Other alkylation conditions include use of a mol ratio of isobutane to olefin supplied to the alkylation zone (including isobutane recycle) substantially in excess of 1:1, and generally between about 4:1 and about 10:1, use of a liquid catalyst:liquid hydrocarbon volume ratio between about 0.5:1 and 5:1 and preferably about 1:1; and use of alkylation strength catalyst, e.g. sulfuric acid of at least about 88% strength, HF of at least about 85% titratable acidity, or an aluminum chloride-hydrocarbon complex liquid catalyst, e.g. one having an active aluminum chloride content (expressed as equivalent aluminum) of at least about 15 weight percent. The preferred catalyst is a liquid which is non-volatile under the alkylation reaction conditions, and particularly preferred is sulfuric acid maintained at about 88 to 92% strength by the addition of make-up 98–99.5% sulfuric acid in amount sufficient to maintain this strength while purging spent acid from the system.

An important part of the isobutane available for alkylation processing is obtained by fractional distillation of alkylation products in a deisobutanizing fractional distillation zone, the isobutane being recovered as a distillate fraction of high isobutane concentration, e.g. 85–95 liquid volume percent isobutane. The higher-boiling alkylate in such distillation zone is recovered in the liquid bottoms fraction. This liquid bottoms fraction ordinarily is redistilled in conventional manner to separate light ends and to produce the high quality alkylate fuel blending stock.

In a self-refrigerated alkylation zone the preponderant hydrocarbons present in the evaporated mixture include the highly volatile propane, if that is present in the reaction mixture, and isobutane. Very little alkylate escapes into the vapor phase in such evaporation for refrigeration purposes. The remaining hydrocarbon liquid, comprising unevaporated isobutane and higher boiling materials including the alkylate, is the mixture sent to the deisobutanizing fractional distillation zone. Where the alkylation unit is refrigerated by a closed cycle refrigeration system employing ammonia, propane, or other refrigerant, no hydrocarbons are evaporated from the reaction mixture to cool it, and the alkylation products fed to the deisobutanizing fractional distillation are the whole spectrum of hydrocarbons from propane on up through the alkylate.

In the usual deisobutanizing fractional distillation operation a heavy reflux of isobutane distillate is returned (e.g. a reflux ratio about 6:1) to the top of the distilling column to maintain high isobutane purity in the distillate, and only a small amount of the distillate is actually withdrawn for feed to the alkylation reactor and maintenance of the isobutane excess in the reacted mix relative to all the other hydrocarbons present therein.

Advantages of my process over conventional isobutane-olefin alkylation processes include these: my process is adaptable to the maintenance of a higher isobutane concentration in a primary alkylation zone reaction mixture than has heretofore been previously practical; it permits a plurality of alkylation reaction zones and reactor types to be operated conjointly with a single isobutane recovery system, thereby allowing the refiner to use the best specific reactor design for the particular kind of alkylation being done in each alkylation zone; it is more flexible in the types of feeds it can use for alkylation because, having a plurality of active alkylation zones, more than one kind of olefin feed can be utilized, and utilized most effectively, under conditions most economical for that particular olefin feed; and, because of the single recovery system with the plurality of alkylation reaction zones, a largely increased production is possible for substantially less than a corresponding increase in the deisobutanizing fractional distillation utilities cost and equipment investment.

Quite significantly, my process differs from previous alkylation processes which use a series of alkylation reactors because in my process the passage of diluent alkylate between alkylation reactors is positively eliminated, and this permits the maintenance of higher isobutane concentration in the reactor series with less isobutane being handled to compensate for such diluent. Furthermore, the alkylate made in a particular zone is not subjected to prolonged reaction conditions in any subsequent alkylation zone whereby undesirable side reactions could occur.

Broadly, my improvement in catalytic alkylation process wherein isobutane in molar excess and an olefin-based alkylatable material are reacted in liquid phase in an alkylation zone in the presence of an alkylation catalyst under alkylating conditions and isobutane is recovered from alkylation products by fractional distillation thereof in a deisobutanizing fractional distillation zone for reuse in the process, the improvement which comprises: maintaining a series of a primary and at least one subsequent alkylation zone, at least all but the ultimate of said series of alkylation zones being self refrigerated by evaporation of low boiling hydrocarbon components comprising part of the isobutane from the resulting hydrocarbon mixture of that zone, recovering from each of said alkylation zones a body of remaining hydrocarbon liquid containing alkylate and isobutane, supplying as an isobutane feed to said primary alkylation zone at least part of the overhead isobutane distillate from said deisobutanizing fractional distillation zone, supplying as an isobutane feed to the subsequent alkylation zone isobutane from the evaporated low boiling components resulting from the refrigeration of a previous alkylation zone in the series, passing the recovered remaining hydrocarbon from each of said alkylation zones to said deisobutanizing fractional distillation zone, recovering therefrom an isobutane-rich fraction as an overhead distillate for feeding to said primary alkylation zone, and recovering alkylate in the liquid bottoms fraction from said deisobutanizing fractional distillation zone.

The drawings are flow diagrams showing various ways in which my improvement can be applied to the alkylation process. They are discussed in detail hereinafter.

The reactors used can be conventional types, e.g. one employing internal recirculation such as the so-called "Stratco Contactor"; one employing autorefrigeration such as the so-called "Cascade" reactor; a pump and time tank type unit wherein the average time of contact of the alkylation reaction mixture and catalyst is generally between about 5 and about 45 minutes and, advantageously, is 5 to 20 minutes; one employing external recycle of alkylation emulsion; one employing injection of reactor feed for agitation; and a closed cycle refrigerated reactor, that is one wherein the refrigeration is supplied by indirect heat exchange of the reaction mixture with a conventional indirect refrigerant supplied by an independent system. It is usually advantageous to agitate the alkylation reaction mixture mechanically, but this can be dispensed with or minimized when using some reactor types.

It should be noted that all the alkylation zones used in my process can be of the sort refrigerated by evaporation of low boiling hydrocarbon components comprising part of the isobutane from the resulting hydrocarbon mixture of that zone, i.e. self-refrigerated reaction zones such as those employing autorefrigeration or effluent refrigeration. Such arrangement is preferred, particularly when only two alkylation zones are used.

Alternatively, the ultimate alkylation zone in a series of alkylation zones operated in accordance with the principles of my invention can be operated on a closed cycle refrigeration system if desired, but the alkylation zone or zones preceding it in the series must employ some type of self-refrigeration (e.g. effluent refrigeration or autorefrigeration) to prevent passage of diluent alkylate to the alkylation zone downstream in the series. Of course, one primary or intermediate alkylation zone can supply a plurality of ultimate alkylation zones connected with each other in parallel flow (as to the isobutane feed).

In the systems illustrated in the drawings the catalysts used are liquids such as sulfuric acid, aluminum chloride-hydrocarbon complex liquid, or hydrogen fluoride. If a solid catalyst such as aluminum chloride is employed, a catalyst circulating system is not needed. The alkylation zones can be adapted to such catalyst in a conventional manner not shown.

Generally, the olefin-based alkylatable material for use in my process will be an olefin, that is propylene, butylene, amylene or higher olefin, or a mixture thereof. Alternatively, a suitable alkyl sulfate or alkyl halide can be employed in one or more of the alkylation zones.

In one particularly advantageous adaptation of my invention where two alkylation zones are used the olefinic feed to the primary alkylation zone comprises preponderantly propylene, e.g. propylene with only 5-20 liquid volume percent of promotional butylene and/or higher olefins therein, and the feed to the subsequent alkylation zone comprises olefinic hydrocarbon substantially devoid of propylene, e.g. butylene alone or with higher olefins. In such operation the butylene-containing olefinic feed to the second reactor is ordinarily a conventional B-B feed, and it will contain a small amount of propane, e.g. about one liquid volume percent. However, the propylene-containing olefinic feed to the primary alkylation zone will generally have a great deal more propane, e.g. 10-60 liquid volume percent propane, or even more. In such instance both of the alkylation zones advantageously are operated with autorefrigeration or effluent refrigeration, and the low boiling components are condensed together and subjected to a single depropanizing fractional distillation with propane being recovered in the overhead distillate and isobutane being recovered in a liquid bottoms fraction. Such liquid bottoms fraction is fed to the subsequent alkylation zone for maintaining a high isobutane concentration therein. FIGURE 1 depicts this embodiment of my invention.

It is understood, however, that the vapors from each alkylation zone can be depropanized independently, if desired, and it is possible to operate so that the vapors from a particular alkylation zone need not be depropanized continuously or depropanized at all in certain situations.

In another adaptation of my invention the primary alkylation zone is fed with an olefinic feed which is a butylene feed containing not substantially above about 30 liquid volume percent of normal butane, e.g. the butylene obtained from a conventional fluid catalytic cracking of hydrocarbons, and the subsequent alkylation zone is fed with a butylene feed richer than this in normal butane, e.g. a butylene obtained by a conventional thermal cracking of hydrocarbons. Such staging of butylene feeds precludes a building up of normal butane concentration in the primary alkylation zone. A typical cat-cracked butylene feed will have 40-60% butylene and the balance saturates, the saturated fraction being generally 70-80% isobutane and 20-25% n-butane. A typical thermally-cracked butylene feed will have about the same unsat. to saturate ratio, but the saturated fraction has generally 25-30% isobutane and 70-75% n-butane.

For clarity only the major equipment is represented in the flow diagrams hereinafter described. Instruments, surge and storage tanks, reboilers, and most valves are not shown, but are to be employed in conventional manner wherever necessary or desirable. It is to be understood that a particular alkylation zone reaction vessel can stand for a single or a plurality of suitable vessels connected conventionally in parallel or series arrangement in a particular location.

All flow rates indicated in this application are given in barrels of liquid per operating day regardless of whether the flow in question is in the liquid or the vapor state. All compositions herein are in liquid volume percent.

The following gives the basis of design with special reference to FIGURE 1 for a plant producing 3000 b.p.o.d. of automotive (motor) alkylate. An isobutane-rich distillate, 28,000 b.p.o.d. consisting of 92% isobutane, 4% n-butane, 4% propane, and only a trace of $C_5+$ hydrocarbons, passes through vapor line 10 from deisobutanizer 12, a conventional tray tower, and is condensed in condenser 13. The entire distillate is withdrawn from the condenser through line 15 but, if desired, a fraction of it can be refluxed back to the deisobutanizing fraction distillation tower through reflux return 14. The isobutane-rich distillate is cooled in heat exchanger 16, as hereinafter described, and fed through line 17 into alkylation contactor 18, which is the primary alkylation zone.

A propylene feed consisting of 485 b.p.o.d. of propylene, 85 b.p.o.d. butylene, and 430 b.p.o.d. of propane is fed through line 19, exchanger 20, and inlet 22 into contactor 18 also. The primary alkylation reaction zone temperature is maintained at 45° F. and the pressure at 50 p.s.i.g. whereby reaction zone contents are maintained in liquid phase.

The reactor output is withdrawn through line 23 into settler 24. Sulfuric acid separated therein is recycled through line 25 to the contactor. The hydrocarbon to acid liquid volume ratio in the contactor is maintained at about 1:1 and the acid at 92% strength by purging spent acid from line 26 and making it up with 99% sulfuric acid through inlet 27. Separated liquid hydrocarbon effluent phase (the "reacted mix" which contains 86% isobutane) is passed through line 28 and pressure reduction valve 29 whereby the pressure is reduced to 5 p.s.i.g. with the resultant flashing of lower boiling components including some of the isobutane and propane. The chilled liquid-vapor mixture so formed is passed directly through line 30 and cooling coil 32, then out line 33 and into vapor-liquid separator 34. Herein vapors, 4200 b.p.o.d., are withdrawn through line 45 for compression and condensation while the remaining hydrocarbon liquid, 24,500 b.p.o.d. containing alkylate and unvaporized isobutane, is withdrawn through line 35 for cooling of feeds and neutralization.

More specifically, a portion of this remaining hydrocarbon liquid is passed through line 36, heat exchanger 20, and outlet 37 for cooling the olefinic feed while the balance is fed through line 38, heat exchange 16, and outlet 39 for cooling the isobutane feed. Thus exchanged, the remaining liquid passes through line 40 and is neutralized with aqueous caustic soda solution in conventional manner as indicated generally in the drawing by item 42, then washed with water in conventional manner as indicated generally in the drawing by item 43. The neutralized, washed remaining hydrocarbon liquid containing alkylate and isobutane passes through lines 44 and 99 for refluxing the top tray of deisobutanizer 12. On occasion some or all of this reflux can be diverted to a lower tray in the tower by means of line 98.

The hydrocarbon vapors from the primary alkylation zone, passing through line 45, and those from the subsequent alkylation zone, obtained as hereinafter described, passing through line 46, are compressed together in compressor 47 to a pressure of 130 p.s.i.a., then withdrawn through line 48 and condensed in condenser 49. The condensate is discharged through line 50 and pressure reducing valve 52 whereby a supplemental flashing takes place. The resulting chilled liquid and vapor phases pass through line 54 into separator 55. The chilled resulting isobutane-rich liquid from this flashing is discharged through line 56 to feed isobutane to and simultaneously to assist in refrigerating the subsequent alkylation zone.

The vapors from separator 55, thus enriched in propane, pass through line 57 and compressor 58, and are compressed to 180 p.s.i.a. Thus compressed, these vapors are condensed in condenser 59. The condensate is discharged through line 60 for neutralization with aqueous caustic soda solution in conventional manner as indicated generally in the drawing by item 62, then water-washed in conventional manner as indicated generally in the drawing by item 63.

Thus treated, these hydrocarbons are feed to depropanizing tower 65, a fractional distillation column operated in conventional manner to separate as an overhead product 500 b.p.o.d. of preponderantly propane, for use as L.P.G. or the like, and an isobutane-rich liquid bottoms fraction substantially completely depropanized (less than about 5% propane). It should be understood here that, if desired, the condensate or compressed vapors from compressor 47 can be fed directly to a depropanizer.

Overhead distillate from the depropanizer is condensed in condenser 66 with the preponderantly propane product being withdrawn through line 67 and reflux returned to the column through line 68. The liquid bottoms fraction passes through line 69, cooler 70, line 72, heat exchanger 73, and inlet 74 to feed the subsequent alkylation zone, represented by contactor 75. The total isobutane-rich feed to contactor 75 is about 12,000 b.p.o.d., and this establishes a concentration of 70% isobutane in the reacted mix from this alkylation zone.

Olefinic feed to the subsequent alkylation zone is fed through line 76, this being a nominally butylene feed consisting of 1180 b.p.o.d. of $C_4$ olefin, 70 b.p.o.d. of propane, 500 b.p.o.d. of isobutane, and 150 b.p.o.d. of n-butane. The temperature in the subsequent alkylation zone is maintained at about 45° F. and the pressure about 40 p.s.i.g. whereby the reactor contents are maintained in liquid phase. The hydrocarbon to acid liquid volume ratio in this reaction zone is maintained at about 1:1 and the system acid strength at 92% $H_2SO_4$.

The reactor output is withdrawn through line 77 into acid settler 78. Acid separated herein is recycled to contactor 75 through line 79. A purge of spent acid is withdrawn from line 80, and make-up 99% sulfuric acid is added through line 82 to maintain acid strength and volume substantially constant during the operation.

Separated liquid hydrocarbon effluent phase is passed through line 83 and pressure reducing valve 84. The pressure is reduced to 5 p.s.i.g. by the valve with the resultant flashing of lower boiling hydrocarbon components including isobutane and propane. The resulting chilled liquid and vapor mixture is passed through line 85, cooling coil 86, and outlet 87 with attendant generation of additional hydrocarbon vapors from having refrigerated the subsequent alkylation zone. Vapors from separator 88, 8300 b.p.o.d. containing mainly isobutane with some propane, are fed through line 46 into compressor 47 as hereinbefore described for depropanizing with vapors from line 45.

The hydrocarbon vapor-liquid mixture discharges into separator 88. Remaining liquid hydrocarbons, 5100 b.p.o.d. are separated and pass through line 89, exchanger 73, and outlet 90, these hydrocarbons containing the alkylate and unvolatilized isobutane. They are washed with aqueous caustic soda in conventional manner as indicated generally by item 92 of the drawing, then washed with water in conventional manner as indicated generally by item 94 of the drawing. The so-treated hydrocarbons pass through line 95 and into deisobutanizer tower 96 for fractional distillation and recovery of isobutane. Isobutane make-up for the operation, a mixture of 1550 b.p.o.d. of isobutane and 1350 b.p.o.d. of n-butane, is fed to deisobutanizer 12 through inlet 97. In this tower fractional distillation is conducted with the isobutane-rich distillate passing through line 10 and condenser 13 as hereinbefore described.

The liquid bottoms fraction from deisobutanizer 12 is withdrawn through line 100 and pass into product debutanizer 102, a fractional distillation tower operated in conventional manner. The overhead distillate, a sharp cut of preponderantly normal butane, is condensed in condenser 103; part of it is refluxed to the debutanizer through line 104, and the balance, 1500 b.p.o.d., is withdrawn to storage through line 105. The liquid bottoms fraction, 3000 b.p.o.d. of total alkylate, is withdrawn through line 106 to storage. It is suitable for automotive fuel. If aviation fuel is desired therefrom, these bottoms can be put through a conventional rerun fractional distillation operation to separate a distillate having an end boiling point of 338° F. and alkylate bottoms of higher boiling components useful for cracking stock or the like.

FIGURE 2 shows an embodiment of my process wherein hydrogen fluoride is the catalyst used, and the last of the two alkylation zones is refrigerated by closed cycle cooling with water. Isobutane-rich distillate from deisobutanizer 125, a conventional tray-type tower, is withdrawn through line 126 and condensed in condenser 127. The condensate is passed through line 129 and heat exchanger 130, then to the primary alkylation zone 133 by means of inlet 132. If desired, a portion of the isobutane-rich condensate can be passed through line 128 as reflux to the deisobutanizer, but this is not being practiced in the instant operation.

Olefin feed for the primary alkylation zone, a $C_4$ fraction (nominally a butylene feed) recovered from the catalytic cracking of hydrocarbons and having composition of 50% butylene, 38% isobutane, and 12% n butane, is admitted through line 134, heat exchanger 135 and inlet 136 into contactor 133. Back pressure on the contactor is sufficient to maintain the reactants, products, and catalyst in the liquid phase therein. The alkylation reactor output is withdrawn through line 161 into acid settler 138. Herein liquid HF settles out and is recycled to contactor 133 by means of line 139. Spent HF is purged through outlet 440 to recovery means not shown. Substantially constant acid volume and 92% titratable acidity (by weight in the catalyst fraction) is maintained by admission of make-up acid through line 141 and by admission of recovered HF from line 142. The catalyst to hydrocarbon liquid volume ratio in contactor 133 is about 0.6:1, and the temperature is 45° F.

The separated hydrocarbon effluent is withdrawn through line 433 and passed through pressure reducing valve 434 wherein pressure is reduced to about 5 p.s.i.g. The resulting liquid-vapor mixture passes through lines 435 and 436 into suction trap 437. Herein a portion of the cold liquid hydrocarbon is withdrawn through lines 438 and 439, passed through cooling coil 140, and the hydrocarbon vapor-liquid mixture resulting from refrigerating the reaction zone withdrawn from the cooling coils through lines 442 and 436 for separation in suction trap 437.

The balance of the chilled liquid hydrocarbon reserve from vessel 437 passes through line 143 and is used to cool incoming feeds to contactor 133. Thus, some of the coolant, which is the remaining hydrocarbon liquid containing alkylate and unvaporized isobutane, passes through line 144, exchanger 135, and outlet 145. The rest passes through line 146, exchanger 130, and outlet 147. Thus, exchanged, this recovered liquid containing alkylate and isobutane is passed through line 148 into the top tray of deisobutanizer 125. If desired, some or all of the material can reflux the deisobutanizer from a lower tray through inlet 149. This is not being practiced in the specific operation described.

Hydrocarbon vapors comprising part of the isobutane and virtually all of the propane from the primary alkylation zone pass through line 150 and are condensed in total condenser 152, refrigerated by ammonia on a closed cycle system not shown. The resulting condensate is discharged through line 153. A portion is passed through line 155 into depropanizer 156 in an amount sufficient to prevent the buildup of diluent propane in the system. The depropanizer is operated as a fractional distillation in conventional manner to separate an overhead distillate containing propane and recoverable HF which is condensed in condenser 158. A fraction of the propane condensate is refluxed to the depropanizer through line 159, and the balance withdrawn from the system through line 160 for stripping and recovery of HF by conventional means not shown.

The isobutane-rich depropanizer bottoms are withdrawn through line 162, cooler 163, and outlet 164 to join condensate from line 154 and pass therewith in line 167 as isobutane feed to the subsequent alkylation zone, represented by vessel 168.

The olefin feed to subsequent alkylation zone 168, a $C_4$ fraction (nominally butylene feed) from thermal cracking of hydrocarbons having a composition of 50% butylene, 35% n-butane, and 15% isobutane, enters through line 169. The catalyst in the subsequent alkylation zone is also hydrogen fluoride. The temperature in reactor 168 is maintained at 80° F. by the use of cooling water passing through internal coils entering line 173 and discharging through line 174, and the back pressure on the zone is sufficient to maintain reactants, products, and catalyst in the liquid phase. An acid to hydrocarbon liquid volume ratio of about 0.6:1 is maintained in the subsequent alkylation zone.

The reactor output is withdrawn through line 175 into acid settler 176. Hydrogen fluoride separates out and is recirculated to vessel 168 by means of line 177. Spent catalyst is withdrawn from the system through line 178 for recovery in conventional means not shown, and make-up and recovered HF are added through lines 171 and 179, respectively, to maintain HF volume substantially constant in the reactor and at a titratable acidity of about 92% by weight.

The liquid hydrocarbon effluent from settler 176 is withdrawn through line 180 and is fed into deisobutanizer 125. Make-up isobutane for the operation is provided by passing a butane feed through line 187 into deisobutanizer 125. In the deisobutanizer the hydrocarbons are fractionally distilled to separate an isobutane-rich overhead distillate, handled as hereinbefore described, and, sharply cut therefrom, a liquid bottoms fraction containing hydrocarbons having boiling points above that of isobutane.

The liquid bottoms fraction is withdrawn through line 188 and sent to product debutanizer 189, a fractional distillation column operated in conventional manner, to separate normal butane as an overhead distillate and higher boiling products including alkylate as a liquid bottoms fraction. The normal butane distillate is condensed in condenser 190 and refluxed to the debutanizer through line 192. Normal butane is withdrawn from the system though line 193. The liquid bottoms fraction is withdrawn through line 194 and treated in conventional manner by means not shown for use in automotive gasoline.

FIGURE 3 shows my process adapted to a primary and a plurality of subsequent alkylation zones, the primary zone being a "Cascade" reactor, the first subsequent alkylation zone being a contactor of the internal recirculation type, and the ultimate alkylation zone being of the pump-and-time-tank type wherein the alkylation zone comprises baffled time tank 305, outlet 326, circulating line 306, cooler 307, line 303, and inlet 304.

Isobutane-rich distillate from deisobutanizer 212, a conventional tray type tower, passes through vapor line 210 and is condensed in condenser 213. The condensate is withdrawn through line 215; a portion can be refluxed to tower 212 by means of line 214, if desired. The isobutane rich distillate enters exchanger 216 and inlet 217 to discharge into the first zone of "Cascade" reactor 218. This alkylation reactor is divided into a plurality of zones by baffles 219, 220, 222, and 223. The first three enumerated baffles form reaction zones which are agitated by mixers 224, 225, and 226. In this reactor sulfuric acid catalyst settles out from the hydrocarbons between baffles 222 and 223 and is recycled through line 232; while it can be distributed to each of the agitated zones through inlets 244, 245, and 246, preferably it is all sent through inlet 246 to the zone agitated by mixer 224. Spent catalyst is purged from the system by line 233, and make-up high strength acid catalyst is added into inlet 247 to maintain acid at alkylation strength and substantially constant volume in the reactor. Olefin, preponderantly butylene, is fed to the reaction zone through header 227 and sent to the several agitated zones through lines 228, 229, and 230.

The entire isobutane feed, which is the total overhead distillate from tower 212, can be passed to a "preflash" zone not shown in advance of the first agitated zone in the "Cascade" reactor. In reactor 218 the contents are cooled by evaporation of the lighter components comprising isobutane and propane, and the resulting vapors pass through line 256 into knockout pot 257, together with vapors from the first subsequent stage, obtained as hereinafter described and entering the pot through line 258. Average temperature in vessel 218 is 45° F., and pressure is about 5 p.s.i.g.

The remaining hydrocarbon liquid containing alkylate and isobutane flows over baffle 223 and is withdrawn from vessel 218 by means of line 248. It is sent through exchanger 216 and outlet 249, then it is neutralized with aqueous caustic soda in conventional manner as indicated generally by item 250 of the drawing and washed with water in conventional manner as indicated generally by item 252 of the drawing. The recovered material passes through lines 253 and 254 as reflux to the top tray of tower 212. A portion or all of the hydrocarbon reflux can be sent to a lower tray in the tower by means of line 255.

The hydrocarbon vapors from knockout pot 257 pass through line 259 and are compressed in compressor 260. The compressed distillate passes through line 262 and is totally condensed in condenser 263. The resulting condensate is discharged through line 264, through feed-bottoms heat exchanger 265, thence through line 266 into depropanizer 267, a fractional distillation tower operated in conventional manner. Propane distillate, sharply cut from the higher-boiling hydrocarbons, is condensed in condenser 268, and part of the condensate is refluxed into tower 267 by means of line 269. The balance is withdrawn from the system through line 270.

The isobutane-rich bottoms fraction from depropanizing passes through line 272, exchanger 267, and line 273. A portion of it is sent through line 274, exchanger 276, and line 277 to provide isobutane feed for the first subsequent alkylation zone. The balance is sent through line 275, heat exchanger 298, and line 299 as isobutane feed to the second subsequent and ultimate alkylation zone.

Butylene is fed to the first subsequent alkylation zone through line 279. Pressure therein is sufficient to maintain virtually all the contents in the liquid phase, and temperature is maintained at 45° F. Reactor effluent is withdrawn through line 280 and passes into acid settler 282. Sulfuric acid catalyst is recycled to reactor 278 by means of line 283. Spent acid is purged through line 284 and makeup acid is added through line 285 to maintain reactor acid strength and acid volume substantially constant.

Hydrocarbon alkylation products are withdrawn from settler 282 through line 286 and flashed to a low pressure by passage through volume 287. The resulting chilled liquid and vapor mixture passes through line 288, cooler 289, and line 290, additional hydrocarbon vapors being generated from the cooling of the reactor contents. The resultant cooled hydrocarbon vapor-liquid mixture is discharged into and separated in vessel 292. The low boiling hydrocarbon components, principally isobutane and such propane as is in the system, pass through line 258 into knockout pot 257 as hereinbefore described.

The separated liquid hydrocarbons are withdrawn through line 293, heat exchanger 276, and line 294. This remaining liquid is neutralized in conventional manner with aqueous caustic soda solution as indicated generally in the drawing by item 295, then washed with water in conventional manner as indicated generally in the drawing by item 296. The hydrocarbons are then passed through line 297 into tower 212.

The second subsequent alkylation zone is fed with isobutane from line 299 and a butylene feed containing some amylene which enters through line 300. These hydrocarbon feeds pass through line 302 and inlet 304 into baffled time tank 305, together with circulating emulsion and recycle and make-up sulfuric acid catalyst. Hydrocarbon-catalyst emulsion is withdrawn through line 326 (and a suitable resistance orifice not shown), line 306, cooler 307, and line 303 to provide refrigeration for this alkylation zone, a temperature of about 45° F. being used. Pressure is sufficient to maintain liquid phase conditions in the alkylation zone. The balance of the emulsion is withdrawn from the time tank by means of line 308 and passes into acid settler 309. Settled acid is recycled into emulsion circulating system by means of line 311. Spent acid is purged through line 310, and make-up stronger acid is added through line 312 in an amount sufficient to maintain acid strength and volume substantially constant.

The alkylation products from the ultimate alkylation zone are withdrawn from settler 309 by means of line 313, pass through heat exchanger 298, and are withdrawn through line 314 for neutralization with aqueous caustic soda in conventional manner as shown generally by item 315 of the drawing, then water washing in conventional manner as shown generally by item 316 of the drawing. Thus recovered, the hydrocarbon containing alkylate and unreacted isobutane passes through line 317 into tower 212. Make-up isobutane from a field butane supply is injected in tower 212 by means of line 318.

Fractional distillation is conducted in deisobutanizer 212 to separate an isobutane-rich distillate, handled as hereinbefore described, and a liquid bottoms fraction of hydrocarbons boiling above isobutane. The liquid bottoms fraction is withdrawn through line 319 and passed into product debutanizer 320.

The debutanizer is operated in conventional manner to obtain fractional distillation of normal butane as an overhead distillate, and, sharply cut therefrom, materials boiling above normal butane. The distillate is condensed in condenser 322 and part of it is refluxed to tower 320 by means of line 323. The balance is withdrawn from the system through line 324. The liquid bottoms fraction, containing alkylate and being suitable for automotive engine fuel, is withdrawn through line 325.

I claim:

1. In a catalytic alkylation process wherein isobutane in molar excess and an olefin feed stock comprising propylene are reacted in liquid phase in the presence of an alkylation catalyst under alkylation conditions in a first alkylation zone, said first alkylation zone is self-refrigerated by evaporation of low boiling components including isobutane and propane from the resulting hydrocarbon mixture of that zone, resulting vapor and remaining liquid from said first alkylation zone are separated, isobutane in molar excess and an olefin feed stock comprising butylene are reacted in liquid phase in the presence of an alkylation catalyst under alkylation conditions in a second alkylation zone, said second alkylation zone is self-refrigerated by evaporation of low boiling components including isobutane from the resulting hydrocarbon mixture of that zone, and resulting vapor and remaining liquid from said second alkylation zone are separated, the improvement which comprises passing said remaining liquids from said first and said second alkylation zones to a deisobutanizing fractional distillation zone, separately withdrawing isobutane distillate and deisobutanized alkylate from said deisobutanizing distillation zone, passing said isobutane distillate as a separate isobutane feed to said first alkylation zone, combining resulting vapors from said first and said second alkylation zones, condensing said combined vapors forming a condensate comprising isobutane and propane, and passing at least a portion of said condensate as a separate isobutane feed to said second alkylation zone.

2. In a catalytic alkylation process wherein isobutane in molar excess and an olefin feed stock comprising propylene are reacted in liquid phase in the presence of an alkylation catalyst under alkylation conditions in a first alkylation zone, said first alkylation zone is self-refrigerated by evaporation of low boiling components including isobutane and propane from the resulting hydrocarbon mixture of that zone, resulting vapor and remaining liquid from said first alkylation zone are separated, isobutane in molar excess and an olefin feed stock comprising butylene are reacted in liquid phase in the presence of an alkylation catalyst under alkylation conditions in a second alkylation zone, said second alkylation zone is self-refrigerated by evaporation of low boiling components including isobutane from the resulting hydrocarbon mixture of that zone, and resulting vapor and remaining liquid from said second alkylation zone are separated, the improvement which comprises passing said remaining liquid from said first alkylation zone to the top tray of a deisobutanizing fractional distillation zone, passing said remaining liquid from said second alkylation zone to said deisobutanizing fractional distillation zone, separately withdrawing isobutane distillate and deisobutanized alkylate from said deisobutanizing distillation zone, passing said isobutane distillate to said first alkylation zone, combining resulting vapors from said first and said second alkylation zones, condensing said combined vapors forming a condensate comprising isobutane and propane, and passing at least a portion of said condensate to said second alkylation zone.

3. The process of claim 2 wherein said condensate is subjected to a depropanizing fractional distillation producing a depropanized condensate and said depropanized condensate is passed to said second alkylation zone.

References Cited in the file of this patent

UNITED STATES PATENTS

| | | |
|---|---|---|
| 2,256,880 | Goldsby et al. | Sept. 23, 1941 |
| 2,356,374 | Blount | Aug. 22, 1944 |
| 2,366,627 | Kemp | Jan. 2, 1945 |
| 2,417,251 | Hemminger | Mar. 11, 1947 |
| 2,429,205 | Jenny et al. | Oct. 21, 1947 |
| 2,768,987 | Hart | Oct. 30, 1956 |
| 2,820,073 | Dixon et al. | Jan. 14, 1958 |
| 2,906,796 | Putney | Sept. 29, 1959 |